(12) United States Patent
Jang (10) Patent No.: US 9,547,632 B2
(45) Date of Patent: Jan. 17, 2017

(54) PLAYING MULTIMEDIA ASSOCIATED WITH A SPECIFIC REGION OF A PDF

(76) Inventor: Jin-Hyuk Jang, Seoul (KR)

( * ) Notice: Subject to any disclaimer, the term of this patent is extended or adjusted under 35 U.S.C. 154(b) by 542 days.

(21) Appl. No.: 14/006,712

(22) PCT Filed: Mar. 26, 2012

(86) PCT No.: PCT/KR2012/002169
§ 371 (c)(1),
(2), (4) Date: Sep. 23, 2013

(87) PCT Pub. No.: WO2012/141433
PCT Pub. Date: Oct. 18, 2012

(65) Prior Publication Data
US 2014/0013206 A1    Jan. 9, 2014

(30) Foreign Application Priority Data
Apr. 13, 2011 (KR) .......................... 10-2011-0034430

(51) Int. Cl.
*G06F 17/22* (2006.01)
*G06F 3/14* (2006.01)

(52) U.S. Cl.
CPC ............ *G06F 17/2247* (2013.01); *G06F 3/14* (2013.01); *G09G 2340/02* (2013.01); *G09G 2340/0442* (2013.01); *G09G 2340/14* (2013.01); *G09G 2354/00* (2013.01); *G09G 2380/14* (2013.01)

(58) Field of Classification Search
None
See application file for complete search history.

(56) References Cited

U.S. PATENT DOCUMENTS

| 7,418,656 B1* | 8/2008 | Petersen ............... G06F 17/241 715/230 |
| 7,617,450 B2 | 11/2009 | Jones et al. |
| 2006/0277098 A1* | 12/2006 | Chung .................. G06Q 30/02 705/14.22 |
| 2009/0202226 A1 | 8/2009 | Mckay et al. |
| 2010/0123908 A1 | 5/2010 | Denoue et al. |
| 2012/0066574 A1* | 3/2012 | Lee ....................... G06F 17/246 715/202 |

FOREIGN PATENT DOCUMENTS

KR    10-2000-0072740 A    12/2000

OTHER PUBLICATIONS

International Search Report for PCT/KR2012/002169 mailed Oct. 29, 2012 from Korean intellectual Property Office.

* cited by examiner

*Primary Examiner* — Asher Kells
(74) *Attorney, Agent, or Firm* — Paratus Law Group, PLLC (57) ABSTRACT

Disclosed is a system for playing multimedia for a PDF document-based e-book. According to one embodiment of the present invention relating to the system for playing multimedia for a PDF document-based e-book, it is possible to map an object, such as text and an image, of an e-book document having multimedia content, and to play/stop the multimedia content of the document according to the request of a user.

12 Claims, 4 Drawing Sheets

PLAYING MULTIMEDIA ASSOCIATED WITH A SPECIFIC REGION OF A PDF

CROSS REFERENCE TO PRIOR APPLICATION

This application is a National Stage Patent Application of PCT International Patent Application No. PCT/KR2012/002169 (filed on Mar. 26, 2012) under 35 U.S.C. §371, which claims priority to Korean Patent Application No. 10-2011-0034430 (filed on Apr. 13, 2011), which are all hereby incorporated by reference in their entirety.

BACKGROUND OF THE INVENTION

1. Technical Field

The present invention relates to a system and method for playing multimedia for an e-book based on a PDF document and an application for a PC or mobile device for implementing the same and, more particularly, to a system and method for playing multimedia for an e-book based on a PDF document and an application for a PC or mobile device for implementing the same, in which an object, such as the writings and image of an e-book, is mapped with multimedia content and the multimedia content can be played/stopped on a document in response to a request from a user.

2. Description of the Related Art

In general, the PDF is an abbreviation of a 'Portable Document Format' and is a file format produced using Acrobat or Acrobat Capture developed by Adobe Systems of U.S.A. or equivalent software.

A web cannot provide documents having various formats other than a specific style owing to its limited function. Adobe Systems has distributed Plug-In or Acrobat Reader to users free of charge so that the users can see PDF files on a web. As users who use PDF files are increased, Plug-In or Acrobat Reader has become the most important means when public offices, research institutes, and companies try to distribute documents over the Internet. A PDF file can be printed or can have e-mail attached thereto and can be loaded onto a network server or a website simply. A PDF file having a small file size is an ideal format for electronic distribution.

In particular, the PDF is advantageous in that a PDF file can be viewed and printed in all computers irrespective of whether or not an operating system, software, or a font specific to the PDF file has been installed and it can be viewed and outputted in the state in which a PDF file has been designed in the original application program.

Accordingly, a PDF file has been rooted as an electronic document format standard for the exchange of information which is most safe and reliable so far since it was issued in 1993. In particular, a PDF file has been used in worldwide governments and companies for the safe sharing, management, and keeping of e-books and electronic records as the PDF file was adopted as an international standard in 2008.

In the case of a PDF file provided in an e-book form, there are disadvantages in that provided content is limited because only an image having the same format as a publication can be outputted and multimedia elements, such as moving image/voice, cannot be added to the PDF file.

Furthermore, when receiving an e-book, a user inevitably receives only writings and images provided by a content provider because the user's interaction with objects, such as writings and an image within a document, is difficult. Furthermore, various types of content cannot be provided because a PDF file cannot be associated with media data on the Internet.

Accordingly, there is a need to change an existing static e-book based on a PDF document, outputting only an image having the same format as a publication, into a dynamic e-book capable of providing various types of content in response to a request from a user and to provide the dynamic e-book.

SUMMARY OF THE INVENTION

Embodiments of the present invention are to change an existing static e-book based on a PDF document, outputting only an image having the same format as a publication, into a dynamic e-book capable of providing various types of content in response to a request from a user.

Furthermore, the embodiments of the present invention are to provide various types of content, such as moving images, voice, and animation, to an e-book based on a PDF document and to play multimedia content on a document.

Furthermore, the embodiments of the present invention are to map an object, such as writings and an image of a document, with multimedia content and to play/stop the multimedia content in response to a request from a user, thereby enabling an interaction with the user.

Furthermore, the embodiments of the present invention are to provide various types of content on an e-book without time and distance limits by playing multimedia data at a remote place over a network.

Furthermore, the embodiments of the present invention are to maximize a learning effect by the convergence of a video lecture and an e-book in such a way as to construct a moving image, voice, animation and the like into learning data utilizing multimedia by adding the moving image, voice, animation and the like to the e-book.

In accordance with the present invention, the above and other objects can be accomplished by the provision of a system for playing multimedia for an e-book based on a PDF document, the system comprising: a PDF document processing unit for selecting and loading a PDF file, separating and extracting page elements necessary for rendering, and outputting a PDF document by sending the rendered page elements to an output device; an input data and commentary processing unit for extracting data of a commentary associated with data received in relation to a specific region of the outputted PDF document and separating a sentence structure having a multimedia format from sentence structures included in the extracted data of a functional commentary which can be analyzed; a multimedia source loading unit for checking a location of a multimedia source by analyzing the sentence structure having the multimedia format which has been separated by the input data and commentary processing unit and loading the multimedia source within the PDF file or stored in at least any one of a local storage device and a remote server; and a multimedia play unit for analyzing a header of the loaded multimedia source, classifying a format of the header if the header is a header that can be played, and playing the multimedia source in a form of at least any one of flash, video, and a music file.

The PDF document processing unit comprises a PDF file loading unit for selecting and loading the PDF file and storing the loaded PDF file in memory; a content analysis unit for fetching the PDF file stored in the memory, analyzing PDF data, and separating and extracting the page elements necessary for rendering; a rendering unit for arranging and disposing the page elements, separated and extracted by the content analysis unit, for screen output and controlling the page elements according to characteristics of the output device; and a document output unit for sending and outputting the page elements, rendered by the rendering unit, to the output device.

The input data and commentary processing unit comprises a user input unit for receiving input data comprising an input signal generated when a user selects a specific region of the PDF document; and an input data analysis unit for analyzing the input data, separating the analyzed data into data for simple graphic processing and the data of the commentary, and transferring the data for the simple graphic processing to the content analysis unit.

The input data and commentary processing unit further comprises a commentary analysis unit for receiving the data of the commentary from the input data analysis unit, separating the data of the functional commentary which can be analyzed from the received data, and transferring data of a simple commentary other than the data of the functional commentary or the data of the commentary necessary for the rendering to the content analysis unit.

The input data and commentary processing unit further comprises a sentence structure filtering unit for receiving the data of the functional commentary from the commentary analysis unit and separating the sentence structure having the multimedia format from the sentence structures included in the data of the functional commentary.

The multimedia source loading unit comprises: a sentence structure format analysis unit for analyzing the sentence structure having the multimedia format, received from the sentence structure filtering unit, and transferring a processing command based on the location of the multimedia source; a data mapping unit for receiving the processing command from the sentence structure format analysis unit if the location of the multimedia source is within the PDF file, sending a key, mapped with the multimedia source within the PDF file, to the content analysis unit with reference to a commentary dictionary, and loading the multimedia source using a received pointer indicative of the location of the multimedia source when the content analysis unit searches for the multimedia source using the received key and returns the pointer back to the data mapping unit; and a link processing unit for receiving the processing command from the sentence structure format analysis unit if the location of the multimedia source is outside the PDF file, analyzing whether a link location of the multimedia source is the remote server or the local storage device, and generating a control command.

The multimedia source loading unit further comprises a multimedia file loading unit for receiving the control command from the link processing unit if the location of the multimedia source is the local storage device and loading the multimedia source from the local storage device.

The multimedia source loading unit further comprises a network access unit for accessing the remote server using a network if the location of the multimedia source is the remote server and downloading the multimedia source.

The multimedia play unit comprises: a multimedia format analysis unit for analyzing the header of the loaded multimedia source, classifying the format of the header if the analyzed header is a header which can be played, and transferring the loaded multimedia source to each play unit; a flash play unit for receiving the multimedia source from the multimedia format analysis unit if the multimedia source is an Adobe Flash format and playing the received multimedia source; a video play unit for receiving the multimedia source from the multimedia format analysis unit if the multimedia source is an MP4, WMV, or AVI format and playing the received multimedia source; and a music file play unit for receiving the multimedia source from the multimedia format analysis unit if the multimedia source is an MP3, WMA, or WAV format and playing the received multimedia source.

In accordance with the present invention, the above and other objects can be accomplished by the provision of An application for a PC or mobile device comprising a system for playing multimedia for an e-book based on a PDF document.

In accordance with the present invention, the above and other objects can be accomplished by the provision of a method of playing multimedia for an e-book based on a PDF document, comprising steps of: selecting a specific region of the PDF document; determining whether or not a commentary defined in the specific region is a commentary associated with a multimedia source by analyzing a sentence structure of the commentary defined in the specific region; checking a location of the multimedia source if the commentary defined in the specific region is the commentary associated with the multimedia source and loading the multimedia source within a PDF file or stored in at least any one of a local storage device and a remote server; and analyzing a header of the loaded multimedia source, classifying a format of the header if the analyzed header is a header which can be played, and playing the multimedia source in a form of at least any one of flash, video, and a music file.

The step of determining whether or not the commentary defined in the specific region is the commentary associated with the multimedia source comprises a step of receiving input data comprising an input signal generated when the specific region is selected, extracting data of the commentary defined in the specific region, and separating a sentence structure, having a multimedia format which can be processed, from sentence structures included in the extracted data of a functional commentary which can be analyzed.

The step of loading the multimedia source comprises steps of: analyzing the sentence structure having the multimedia format, searching for a key mapped with the multimedia source within the PDF file with reference to a commentary dictionary of the location of the multimedia source is within the PDF file, and loading the multimedia source; receiving a control command if the location of the multimedia source is the local storage device and loading the multimedia source from the local storage device; and accessing the remote server if the location of the multimedia source is the remote server using a network and downloading the multimedia source.

The step of playing the multimedia source comprises steps of: analyzing the header of the loaded multimedia source, classifying a format of the header if the analyzed header is a header which can be played, and transferring the loaded multimedia source to each play unit; receiving, by a flash play unit, the multimedia source if the multimedia source is an Adobe Flash format and playing the received multimedia source; receiving, by a video play unit, the multimedia source if the multimedia source is an MP4, WMV, or AVI format and playing the received multimedia source; and receiving, by a music file play unit, the multimedia source if the multimedia source is an MP3, WMA, or WAV format and playing the received multimedia source.

DETAILED DESCRIPTION

Hereinafter, preferred embodiments of the present invention are described in detail with reference to the accompanying drawing. However, the present invention is not limited to embodiments described herein, but may be materialized in other forms. On the contrary, the introduced embodiments are provided to make disclosed contents thorough and complete and sufficiently deliver the spirit of the present invention to a person having ordinary skill in the art. The same reference numerals designate the same elements throughout the specification.

Figure 1:
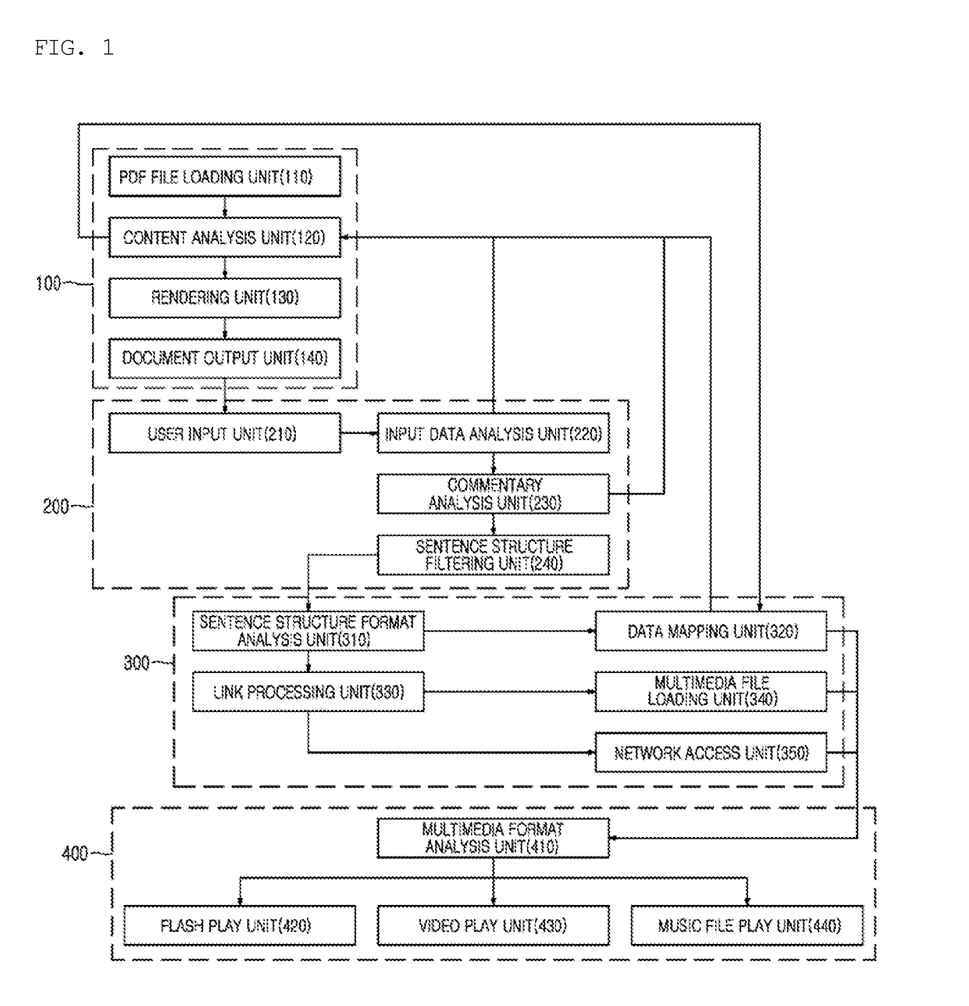
FIG. 1 is a block diagram showing a detailed construction of a system for playing multimedia for an e-book based on a PDF document in accordance with an embodiment of the present invention.
Figure 2:
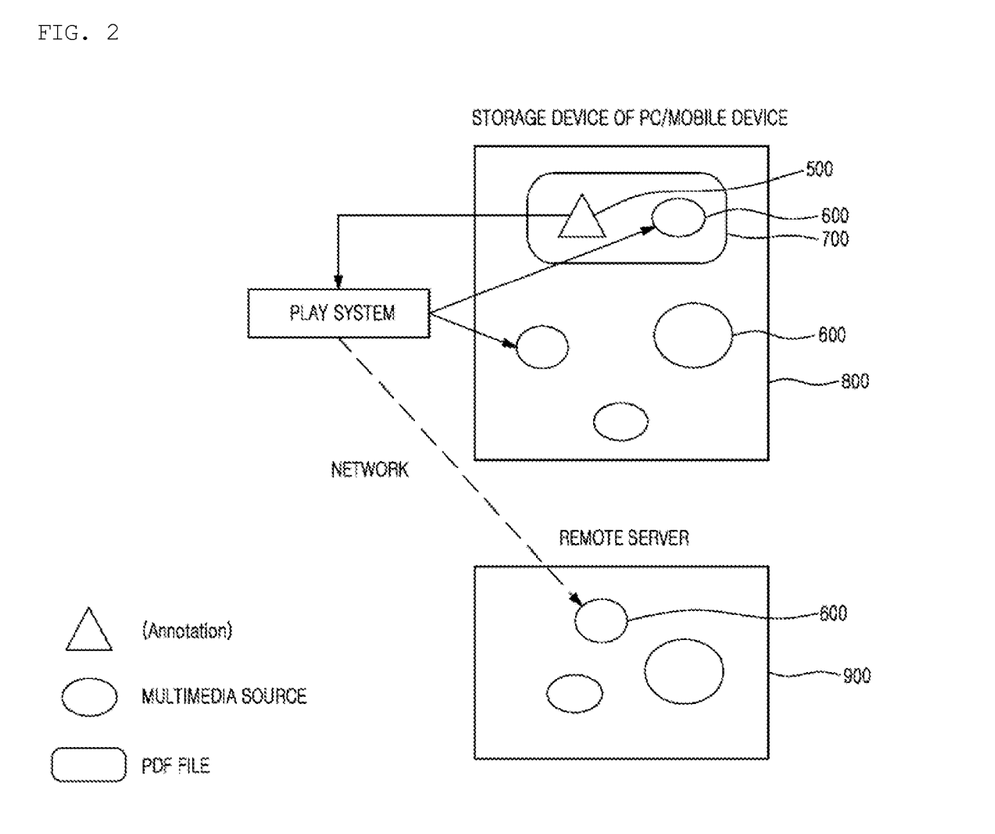
FIG. 2 shows a construction schematically illustrating access and a play relationship depending on the location of a multimedia source in the system for playing multimedia for an e-book based on a PDF document in accordance with an embodiment of the present invention.
Figure 3:
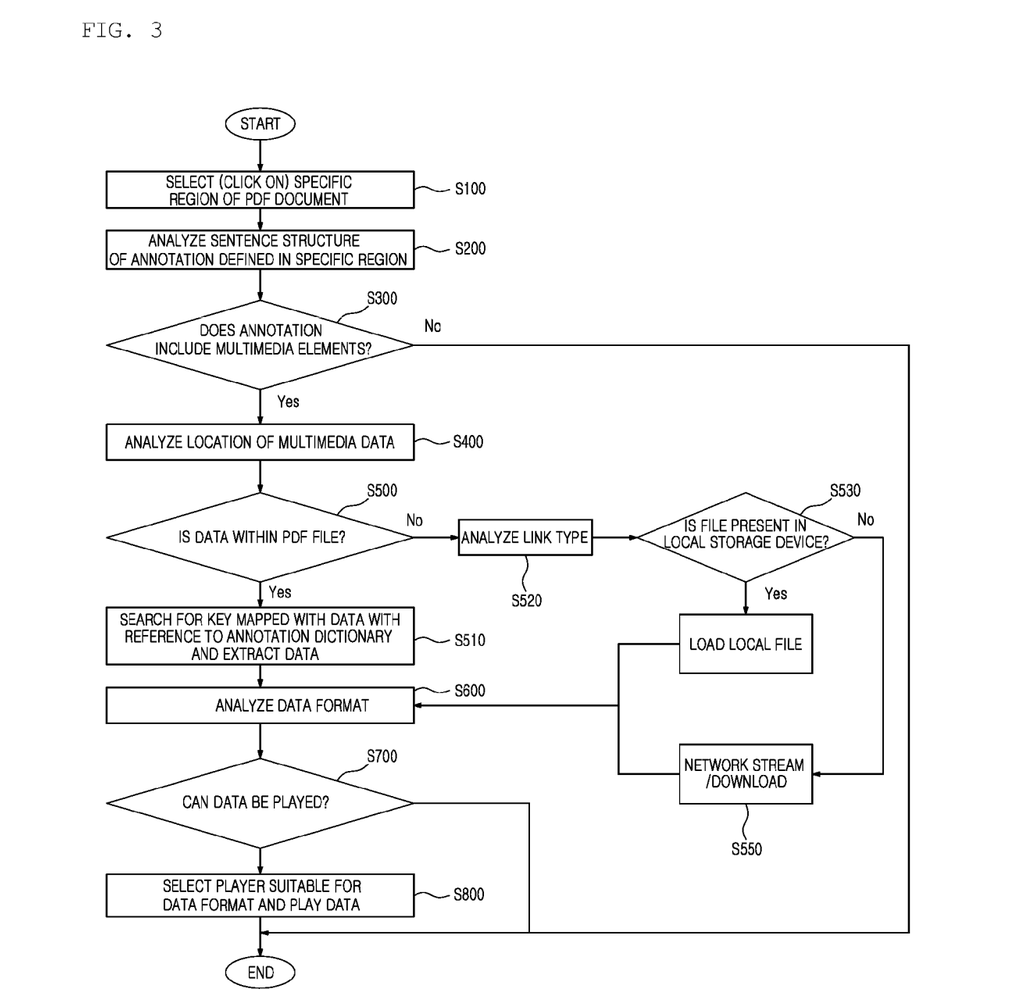
FIG. 3 is a flowchart illustrating order that a method of playing multimedia for an e-book based on a PDF document is implemented in accordance with an embodiment of the present invention.
Figure 4:
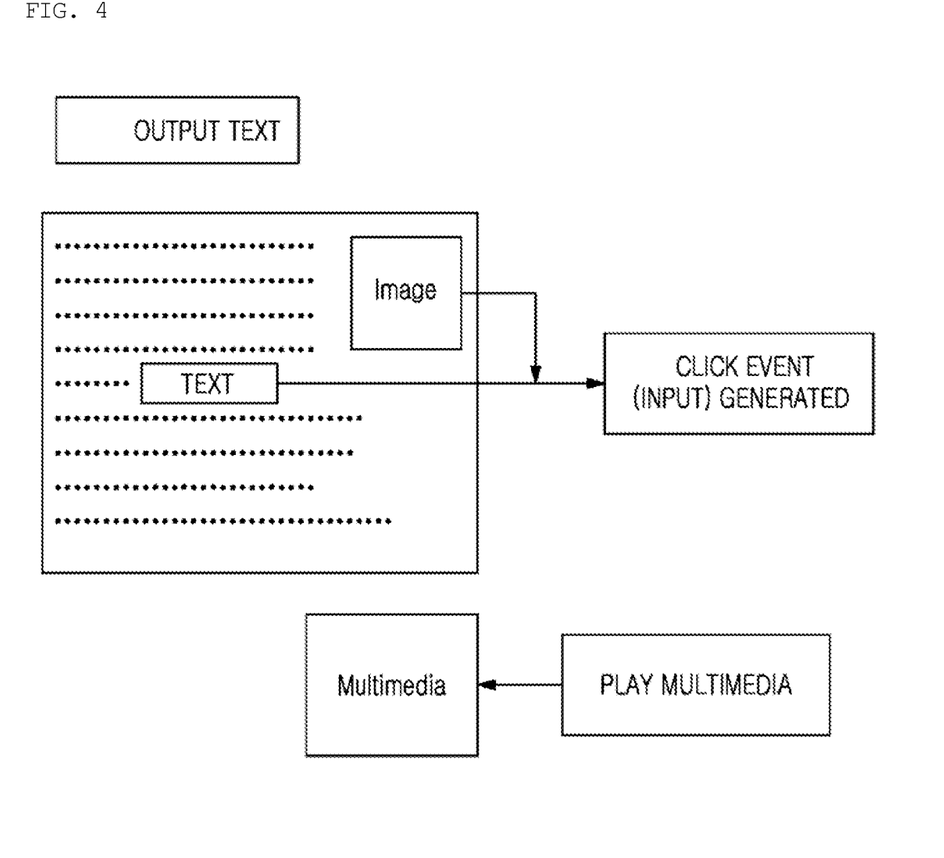
FIG. 4 is an exemplary diagram illustrating an example in which the method of playing multimedia for an e-book based on a PDF document in accordance with an embodiment of the present invention is implemented.

FIG. 1 is a block diagram showing a detailed construction of a system for playing multimedia for an e-book based on a PDF document in accordance with an embodiment of the present invention, FIG. 2 shows a construction schematically illustrating access and a play relationship depending on the location of a multimedia source in the system for playing multimedia for an e-book based on a PDF document in accordance with an embodiment of the present invention, FIG. 3 is a flowchart illustrating order that a method of playing multimedia for an e-book based on a PDF document is implemented in accordance with an embodiment of the present invention, and FIG. 4 is an exemplary diagram illustrating an example in which the method of playing multimedia for an e-book based on a PDF document in accordance with an embodiment of the present invention is implemented.

Referring to FIGS. 1 to 4, the system for playing multimedia for an e-book based on a PDF document in accordance with an embodiment of the present invention can basically include a PDF document processing unit 100 for selecting and loading a PDF file 700, separating and extracting page elements necessary for rendering, and outputting a PDF document by sending the rendered page elements to an output device (not shown), an input data and commentary processing unit 200 for extracting the data of a commentary 500 that is associated with data received in relation to a specific region of the outputted PDF document and separating a sentence structure having a multimedia format from sentence structures included in the extracted data of a functional commentary 500 which can be analyzed, a multimedia source loading unit 300 for checking the location of a multimedia source 600 by analyzing the sentence structure having the multimedia format, separated by the input data and commentary processing unit 200, and loading the multimedia source 600 within the PDF file 700 or stored in at least any one of a local storage device 800 and a remote server 900, and a multimedia play unit 400 for analyzing the header of the loaded multimedia source 600, classifying a format of the header if the header is a header that can be played, and playing the multimedia source 600 in the form of at least any one of flash, video, and a music file.

The PDF file 700 can be produced in order to provide various types of works, such as various types of books, magazines, home-school materials, information brochures, and catalogues, in an e-book, that is, e-book form. The PDF document processing unit 100 performs basic processing on the PDF file 700. To this end, the PDF document processing unit 100 can include a PDF file loading unit 110, a content analysis unit 120, a rendering unit 130, a document output unit 140 and the like.

Specifically, when a user selects the PDF file 700 to be stored in a PC or mobile device, the PDF file loading unit 110 loads the selected PDF file 700 and stores the loaded PDF file 700 in memory installed in the PC or mobile device.

Furthermore, the content analysis unit 120 fetches the PDF file 700 stored in the memory, analyzes data for the output of a PDF document in the fetched PDF file, and separates and extracts page elements necessary for rendering from the analyzed data in order to configure the screen of the PDF document to be outputted. Here, the page elements refer to elements including graphic or text, that is, elements that form an image of the PDF document to be outputted.

Here, the content analysis unit 120 first extracts only data items related to basic page elements necessary for rendering and performs parsing on the remaining items only when an additional call signal is received.

Meanwhile, the rendering unit 130 arranges and disposes the page elements separated and extracted by the content analysis unit 120 for the screen output and generates the image of the PDF document to be outputted by controlling the page elements according to the characteristics of an output device.

Thereafter, the document output unit 140 sends the page elements, rendered by the rendering unit 130, to an output device, thus finally outputting the PDF document that can be viewed by a user. Here, the output device can include hardware, such as a graphic processing device and a display device for implementing the rendered data into a real image.

A user can read the contents of a work included in the e-book through the PDF document outputted as described above. The user can access the multimedia source 600 inside or outside the PDF file 700 by selecting a specific region of the PDF document while reading the work.

A construction and operational process in which a user can play the multimedia source 600 on the PDF document are described in detail. First, the input data and commentary processing unit 200 can perform a function of extracting the data of the commentary 500 that is associated with data received in relation to the specific region of the outputted PDF document and separating a sentence structure, having a multimedia format which can be processed, from sentence structures included in the data extracted of a functional commentary 500 which can be analyzed.

To this end, the input data and commentary processing unit 200 can include a user input unit 210, an input data analysis unit 220, a commentary analysis unit 230, and a sentence structure filtering unit 240.

First, the user input unit 210 receives input data including an input signal that is generated when a user selects the specific region of the PDF document. The input signal is generated when data or an event, such as a click & drag, is received from a user, and these input data can be inputted through a keyboard, a mouse, a touch screen, a keypad, or a voice recognition device, that is, the input device of a PC or mobile device.

Here, the specific region of the PDF document is a specific region including images, text and the like. that are included in the outputted PDF document. A user can generate the input signal for playing the multimedia source 600 by clicking on, for example, the specific region.

Meanwhile, the input data analysis unit 220 analyzes the input data received as described above, separates data for simple graphic processing and the data of the commentary 500 from the analyzed data, and transfers the data for simple graphic processing to the content analysis unit 120 and the data of the commentary 500 to the commentary analysis unit 230.

If the input signal is for common graphic processing, such as the enlargement or reduction of a screen or a movement of a page, the input data analysis unit 220 sends the input data to the content analysis unit 120 and separates and extracts new page elements based on input data received from the content analysis unit 120, thus constructing a new screen corresponding to the input data through rendering.

Furthermore, the data of the commentary 500 transferred to the commentary analysis unit 230 plays an important role for playing the multimedia source 600 in the system for playing multimedia for an e-book based on a PDF document in accordance with an embodiment of the present invention.

The commentary 500 has been chiefly introduced to perform cooperation and supplementary description and intention delivery functions in a PDF document that is difficult to be modified and edited. In the embodiments of the present invention, the commentary 500 functions as a medium or a command system for playing the multimedia source 600.

In particular, the commentary analysis unit 230 receives the data of the commentary 500, separates the data of the functional commentary 500 which can be separated from the received data, transfers the separated data to the sentence structure filtering unit 240, and transfers the data of a simple commentary 500 other than the data of a functional commentary 500 or the data of the commentary 500 necessary for rendering to the content analysis unit 120. The content analysis unit 120 uses the received data of the commentary 500 to extract the page elements.

Specifically, the commentary analysis unit 230 can be configured to classify a commentary format, defined as Text, Link, FreeText, Line, Square, Circle, Polygon, PolyLine, Highlight, Underline, Squiggly, StrikeOut, Stamp, Caret, Ink, Popup, FileAttachment, Sound, Movie, Widget, Screen, PrinterMark, TrapNet, Watermark, 3D, Redact, Projection, and RichMedia, by analyzing the received data.

The sentence structure filtering unit 240 can receive the data of the functional commentary 500 from the commentary analysis unit 230 and separate a sentence structure having a multimedia format which can be processed from sentence structures included in the data of the functional commentary 500.

That is, the sentence structure filtering unit 240 separates only commentaries related to multimedia processing from the analyzed commentaries, checks whether or not the grammar of a commentary having a specific format, for example ResourceLocator, MediaWidth, MediaHeight, DispWidth, DispHeight, MainRect, HideMenu, Popup, TitleChange, ClientToHost, ToolBar, FullScreen, NavigateBar, Close, SetWidth, SetHeight, Resizable, or SecureLock, is correct, outputs an error in the grammar, and displays a format part that is not supported so that exceptional circumstances can be processed.

Meanwhile, the multimedia source loading unit 300 checks the location of the multimedia source 600 by analyzing the sentence structure having the multimedia format which has been separated by the input data and commentary processing unit 200 and loads the multimedia source 600 within the PDF file 700 or stored in at least one of the local storage device 800 and the remote server 900.

That is, after the input data and commentary processing unit 200 separates the sentence structure having the multimedia format which can be processed from the sentence structures included in the extracted data of the functional commentary 500 which can be analyzed, the multimedia source loading unit 300 performs a function of receiving the separated sentence structure having a multimedia format, checking the location of the multimedia source 600 by analyzing the separated sentence structure, and loading the multimedia source 600.

In order to perform this function, the multimedia source loading unit 300 can include a sentence structure format analysis unit 310, a data mapping unit 320, a link processing unit 330, a multimedia file loading unit 340, a network access unit 350 and the like.

Specifically, the sentence structure format analysis unit 310 analyzes the sentence structure having the multimedia format, received from the sentence structure filtering unit 240, and transfers a processing command based on a location of the multimedia source 600. The sentence structure format analysis unit 310 transfers the processing command to the data mapping unit 320 if the multimedia source 600 is within the PDF file 700 and transfers the processing command to the link processing unit 330 if the multimedia source 600 is placed outside.

Here, the sentence structure format analysis unit 310 determines a processing method based on a data (multimedia) location by analyzing the sentence structure and extracts and applies attribute values. For example, in the case of a sentence structure, such as "RL (ResourceLocator)=mediafile, DW (DispWidth)=500, DH (DispHeight)=400, Popup=T", the sentence structure format analysis unit 310 transfers the processing command prompting that a media file is outputted in the form of a pop-up window having a size of 500 pixels in length and 400 pixels in breadth.

If the location of the multimedia source is within the PDF file, the data mapping unit 320 receives the processing command from the sentence structure format analysis unit 310 and sends a key, mapped with the multimedia source 600 within the PDF file, to the content analysis unit 120 with reference to a commentary dictionary. When the content analysis unit 120 searches for the multimedia source 600 using the received key and returns a pointer indicative of the location of the multimedia source 600 back to the data mapping unit 320, the data mapping unit 320 loads the multimedia source 600 using the received pointer.

Meanwhile, if the location of the multimedia source 600 is outside the PDF file 700, the link processing unit 330 receives the processing command from the sentence structure format analysis unit 310, analyzes whether the link location of the multimedia source 600 is the remote server 900 or the local storage device 800, and generates a control command.

Here, if the location of the multimedia source 600 is the local storage device 800, the multimedia file loading unit 340 receives the control command from the link processing unit 330 and loads the multimedia source 600 from the local storage device 800. If the location of the multimedia source 600 is the remote server 900, the network access unit 350 accesses the remote server 900 over a network and downloads the multimedia source 600.

When the multimedia source 600 is loaded onto a corresponding location as described above, the multimedia play unit 400 analyzes the header of the loaded multimedia source 600. If the analyzed header is a header that can be played, the multimedia play unit 400 classifies a format of the header and plays the multimedia source 600 in the form of at least any one of flash, video, and a music file.

The multimedia play unit 400 can include a multimedia format analysis unit 410, a flash play unit 420, a video play unit 430, a music file play unit 440 and the like.

Specifically, if the analyzed header is a header that can be played as a result of analyzing the header of the loaded multimedia source 600, the multimedia format analysis unit 410 classifies a format of the header and transfers the loaded multimedia source 600 to each play unit to.

The multimedia format analysis unit 410 can be configured to check whether or not, for example, pre-loaded data is supportable media by analyzing the header of the pre-loaded data. The header format of the pre-loaded data can have, for example, Mp3=>49 44 33 02 03 76 54 45 4E
WMV=>30 26 B2 75 8E 66 CF 11 A6 D9
SWF=>43 57 53 09 5C 0B 02 00 78 9C.

After the format of the multimedia source 600 is checked by the multimedia format analysis unit 410 as described above, if the multimedia source 600 has an Adobe Flash format, the flash play unit 420 can be configured to receive the multimedia source from the multimedia format analysis unit 410 and play the received multimedia source. If the multimedia source 600 has an MP4, WMV, or AVI format, the video play unit 430 can be configured to receive the multimedia source 600 from the multimedia format analysis unit 410 and play the received multimedia source 600. If the multimedia source has an MP3, WMA, or WAV format, the music file play unit 440 can be configured to receive the multimedia source from the multimedia format analysis unit 410 and play the received multimedia source.

A method in which the system for playing multimedia for an e-book based on a PDF document plays multimedia in accordance with an embodiment of the present invention is described below.

First, input data, such as the commentary 500 defined in a specific region of the outputted PDF document, that is, a region defined by an image or text, is received along with an input signal generated when the specific region is selected and clicked (S100).

Furthermore, whether or not the commentary 500 defined in the specific region is the commentary 500 associated with the multimedia source 600 is determined (S300) by analyzing a sentence structure of the commentary 500 (S200).

Here, the input data and commentary processing unit 200 receives the input data including the input signal that is generated when the specific region is selected, extracts the data of the commentary 500 defined in the specific region, separates a sentence structure having a multimedia format which can be processed from sentence structures included in the data of the functional commentary 500 which can be analyzed, and thus determines whether or not the commentary 500 defined in the specific region is the commentary 500 associated with the multimedia source 600.

Specifically, the input data analysis unit 220 analyzes the input data received as described above and transfers the data of the commentary 500 associated with the input data to the commentary analysis unit 230. The commentary analysis unit 230 receives the data of the commentary 500, separates the data of a functional commentary 500 which can be analyzed from the received data, and transfers the separated data to the sentence structure filtering unit 240. The sentence structure filtering unit 240 receives the data of the functional commentary 500 from the commentary analysis unit 230 and separates the sentence structure having the multimedia format which can be processed from the sentence structures included in the data of the functional commentary 500.

Thereafter, if the commentary 500 defined in the specific region is the commentary 500 associated with the multimedia source 600, the location of the multimedia source is checked (S400) and the multimedia source 600 within the PDF file 700 or stored in at least any one of the local storage device 800 and the remote server 900 is loaded.

Specifically, whether or not the multimedia source 600 is placed within the PDF file 700 is determined (S500). If the location of the multimedia source 600 is within the PDF file 700, a key mapped with the multimedia source 600 within the PDF file 700 is searched for with reference to a commentary dictionary, and a multimedia source is loaded based on the retrieved key (S510).

Furthermore, if the multimedia source 600 is placed outside the PDF file 700, the link processing unit 330 analyzes whether the link location of the multimedia source 600 is the remote server 900 or the local storage device 800 and generates a control command based on a result of the analysis (S520). If the location of the multimedia source 600 is the local storage device 800, the multimedia file loading unit 340 receives the control command from the link processing unit 330 and loads the multimedia source 600 from the local storage device 800 (S540). If the location of the multimedia source 600 is the remote server 900, the network access unit 350 accesses the remote server 900 over a network and downloads the multimedia source 600 (S550).

Thereafter, the multimedia format analysis unit 410 analyzes the header of the loaded multimedia source 600 (S600) and determines whether or not the analyzed header is a header that can be played (S700). If the analyzed header is a header that can be played, the multimedia format analysis unit 410 classifies a format of the header and selects a player suitable for the data format, so the multimedia source 600 can be played (S800). Here, the multimedia source 600 can be played in the form of a pop-up window that is additionally generated or can be played in the state in which has been overlapped with the PDF document.

The system for playing multimedia for an e-book based on a PDF document can be implemented and provided in the form of an application for a PC or mobile device. In accordance with this system for playing multimedia for an e-book based on a PDF document, an existing static e-book based on a PDF document, outputting only an image having the same format as a publication, can be changed into a dynamic e-book capable of providing various types of content in response to a request from a user.

Furthermore, various types of content, such as moving images, voice, and animation, can be provided to an e-book based on a PDF document, and multimedia content can be played on a document. An object (writings, an image, etc.) of a document can be mapped with multimedia content, and the multimedia content can be played/stopped in response to a request from a user, thereby enabling an interaction with the user. Various types of content can be provided on an e-book without time and distance limits by playing multimedia data at a remote place over a network.

Furthermore, a learning effect can be maximized by the convergence of a video lecture and an e-book in such a way as to construct video, voice, animation and the like into learning data utilizing multimedia by adding the moving image, voice, animation and the like to the e-book.

In the embodiments of the present invention, an existing static e-book based on a PDF document, outputting only an image having the same format as a publication, can be changed into a dynamic e-book capable of providing various types of content in response to a request from a user.

Furthermore, various types of content, such as moving images, voice, and animation, can be provided to an e-book based on a PDF document, and multimedia content can be played on a document.

Furthermore, an object (writings, an image, etc.) of a document can be mapped with multimedia content, and the multimedia content can be played/stopped in response to a request from a user, thereby enabling an interaction with the user.

Furthermore, various types of content can be provided on an e-book without time and distance limits by playing multimedia data at a remote place over a network.

Furthermore, a learning effect can be maximized by the convergence of a video lecture and an e-book in such a way as to construct video, voice, animation and the like into learning data utilizing multimedia by adding the moving image, voice, animation and the like to the e-book.

Although an embodiment of the present invention has been described above, a person having ordinary skill in the art may modify and change the present invention in various ways without departing from the spirit and scope of the present invention written in the following claims. Accordingly, all modified embodiments should be construed as being included in the technical category of the present invention if they basically include the elements of the claims of the present invention.

What is claimed is:

1. A system for playing multimedia for an e-book based on a PDF document, the system comprising:
    a PDF document processing unit for selecting and loading a PDF file, separating and extracting page elements necessary for rendering, and outputting a PDF document by sending the rendered page elements to an output device;
    an input data and commentary processing unit for extracting data of a commentary associated with data received in relation to a specific region of the outputted PDF document and separating a sentence structure having a multimedia format from sentence structures included in the extracted data of a functional commentary which can be analyzed;
    a multimedia source loading unit for checking a location of a multimedia source by analyzing the sentence structure having the multimedia format which has been separated by the input data and commentary processing unit and loading the multimedia source within the PDF file or stored in at least any one of a local storage device and a remote server;
    a multimedia play unit for analyzing a header of the loaded multimedia source, classifying a format of the header if the header is a header that can be played, and playing the multimedia source in a form of at least any one of flash, video, and a music file;
    a sentence structure format analysis unit for analyzing the sentence structure having the multimedia format and transferring a processing command based on the location of the multimedia source;
    a data mapping unit for receiving the processing command from the sentence structure format analysis unit if the location of the multimedia source is within the PDF file, sending a key, mapped with the multimedia source within the PDF file, to the PDF document processing unit with reference to a commentary dictionary, and loading the multimedia source using a received pointer indicative of the location of the multimedia source when the PDF document processing unit searches for the multimedia source using the received key and returns the pointer back to the data mapping unit; and
    a link processing unit for receiving the processing command from the sentence structure format analysis unit if the location of the multimedia source is outside the PDF file, analyzing whether a link location of the multimedia source is the remote server or the local storage device, and generating a control command,
    wherein the PDF document processing unit, the input data and commentary processing unit, the multimedia source loading unit, the multimedia play unit, the sentence structure format analysis unit, the data mapping unit and the link processing unit are each implemented via at least one processor.

2. The system of claim 1, wherein the PDF document processing unit comprises:
    a PDF file loading unit for selecting and loading the PDF file and storing the loaded PDF file in memory;
    a content analysis unit for fetching the PDF file stored in the memory, analyzing PDF data, and separating and extracting the page elements necessary for rendering;
    a rendering unit for arranging and disposing the page elements, separated and extracted by the content analysis unit, for screen output and controlling the page elements according to characteristics of the output device; and
    a document output unit for sending and outputting the page elements, rendered by the rendering unit, to the output device.

3. The system of claim 2, wherein the input data and commentary processing unit comprises:
    a user input unit for receiving input data comprising an input signal generated when a user selects a specific region of the PDF document; and
    an input data analysis unit for analyzing the input data, separating the analyzed data into data for simple graphic processing and the data of the commentary, and transferring the data for the simple graphic processing to the content analysis unit.

4. The system of claim 3, wherein the input data and commentary processing unit further comprises a commentary analysis unit for receiving the data of the commentary from the input data analysis unit, separating the data of the functional commentary which can be analyzed from the received data, and transferring data of a simple commentary other than the data of the functional commentary or the data of the commentary necessary for the rendering to the content analysis unit.

5. The system of claim 4, wherein the input data and commentary processing unit further comprises a sentence structure filtering unit for receiving the data of the functional commentary from the commentary analysis unit and separating the sentence structure having the multimedia format from the sentence structures included in the data of the functional commentary.

6. The system of claim 1, wherein the multimedia source loading unit further comprises a multimedia file loading unit for receiving the control command from the link processing unit if the location of the multimedia source is the local storage device and loading the multimedia source from the local storage device.

7. The system of claim 6, wherein the multimedia source loading unit further comprises a network access unit for accessing the remote server using a network if the location of the multimedia source is the remote server and downloading the multimedia source.

8. The system of claim 1, wherein the multimedia play unit comprises:
- a multimedia format analysis unit for analyzing the header of the loaded multimedia source, classifying the format of the header if the analyzed header is a header which can be played, and transferring the loaded multimedia source to each play unit;
- a flash play unit for receiving the multimedia source from the multimedia format analysis unit if the multimedia source is an Adobe Flash format and playing the received multimedia source;
- a video play unit for receiving the multimedia source from the multimedia format analysis unit if the multimedia source is an MP4, WMV, or AVI format and playing the received multimedia source; and
- a music file play unit for receiving the multimedia source from the multimedia format analysis unit if the multimedia source is an MP3, WMA, or WAV format and playing the received multimedia source.

9. A non-transitory, computer-readable medium storing a program that, when executed by a PC or mobile device, causes the PC or mobile device to execute a method, the method comprising:
- selecting a specific region of the PDF document;
- determining whether or not a commentary defined in the specific region is a commentary associated with a multimedia source by analyzing a sentence structure of the commentary defined in the specific region;
- checking a location of the multimedia source if the commentary defined in the specific region is the commentary associated with the multimedia source and loading the multimedia source within a PDF file or stored in at least any one of a local storage device and a remote server;
- analyzing a header of the loaded multimedia source, classifying a format of the header if the analyzed header is a header which can be played, and playing the multimedia source in a form of at least any one of flash, video, and a music file;
- analyzing the sentence structure having the multimedia format, searching for a key mapped with the multimedia source within the PDF file with reference to a commentary dictionary of the location of the multimedia source within the PDF file, and loading the multimedia source;
- receiving a control command if the location of the multimedia source is the local storage device and loading the multimedia source from the local storage device; and
- accessing the remote server if the location of the multimedia source is the remote server using a network and downloading the multimedia source.

10. A method of playing multimedia for an e-book based on a PDF document, the method being executed via at least one processor, and comprising:
- selecting a specific region of the PDF document;
- determining whether or not a commentary defined in the specific region is a commentary associated with a multimedia source by analyzing a sentence structure of the commentary defined in the specific region;
- checking a location of the multimedia source if the commentary defined in the specific region is the commentary associated with the multimedia source and loading the multimedia source within a PDF file or stored in at least any one of a local storage device and a remote server;
- analyzing a header of the loaded multimedia source, classifying a format of the header if the analyzed header is a header which can be played, and playing the multimedia source in a form of at least any one of flash, video, and a music file;
- analyzing the sentence structure having the multimedia format, searching for a key mapped with the multimedia source within the PDF file with reference to a commentary dictionary of the location of the multimedia source within the PDF file, and loading the multimedia source;
- receiving a control command if the location of the multimedia source is the local storage device and loading the multimedia source from the local storage device; and
- accessing the remote server if the location of the multimedia source is the remote server using a network and downloading the multimedia source.

11. The method of claim 10, wherein the step of determining whether or not the commentary defined in the specific region is the commentary associated with the multimedia source comprises a step of receiving input data comprising an input signal generated when the specific region is selected, extracting data of the commentary defined in the specific region, and separating a sentence structure, having a multimedia format which can be processed, from sentence structures included in the extracted data of a functional commentary which can be analyzed.

12. The method of claim 10 wherein the step of playing the multimedia source comprises steps of:
- analyzing the header of the loaded multimedia source, classifying a format of the header if the analyzed header is a header which can be played, and transferring the loaded multimedia source to each play unit;
- receiving, by a flash play unit, the multimedia source if the multimedia source is an Adobe Flash format and playing the received multimedia source;
- receiving, by a video play unit, the multimedia source if the multimedia source is an MP4, WMV, or AVI format and playing the received multimedia source; and
- receiving, by a music file play unit, the multimedia source if the multimedia source is an MP3, WMA, or WAV format and playing the received multimedia source.

* * * * *